United States Patent [19]

Rodman et al.

[11] 4,411,007

[45] Oct. 18, 1983

[54] DISTRIBUTED NETWORK SYNCHRONIZATION SYSTEM

[75] Inventors: William Rodman, Montreal; Peter Boland, Nepean, both of Canada

[73] Assignee: The Manitoba Telephone System, Winnipeg, Canada

[21] Appl. No.: 258,561

[22] Filed: Apr. 29, 1981

[51] Int. Cl.³ .............................................. H04J 3/06
[52] U.S. Cl. .................................... 375/107; 455/51; 375/109; 375/118
[58] Field of Search ............... 375/106, 108, 109, 114, 375/116, 118, 119, 107; 370/86, 90, 100, 104, 108; 343/7 R, 7.5 R; 358/149; 340/825.08, 825.14, 825.54; 455/12, 13, 17, 51

[56] References Cited

U.S. PATENT DOCUMENTS

| | | | |
|---|---|---|---|
| 3,562,432 | 2/1971 | Gabbard | 370/104 |
| 3,654,395 | 4/1972 | Schmidt | 370/104 |
| 3,671,865 | 6/1972 | Szumilla et al. | 455/51 |
| 3,713,025 | 1/1973 | McNair | 375/118 |
| 3,801,981 | 4/1974 | Alpers | 343/7.5 |
| 3,906,159 | 9/1975 | Lutz | 370/108 |
| 4,117,267 | 9/1978 | Haberle et al. | 370/104 |
| 4,214,261 | 7/1980 | Bazin et al. | 358/149 |
| 4,255,814 | 3/1981 | Osborn | 455/51 |
| 4,271,483 | 6/1981 | Baldwin et al. | 370/108 |
| 4,320,503 | 3/1982 | Acampora | 455/12 |
| 4,337,463 | 6/1982 | Vangen | 340/825.54 |

Primary Examiner—Benedict V. Safourek
Attorney, Agent, or Firm—Stanley G. Ade

[57] ABSTRACT

A synchronization system is provided for a tree-type transmission system comprising a central station connected to a plurality of remote stations in an effectively sequential manner, each station including transmitting and receiving means for digital data in a sequence of frames. Each remote station is instructed regularly by the central station of the time delay between the remote station and the central station. The remote station stores the time delay and arranges to advance information transmitted by the remote station so as to be received by the central station within the proper position in the frame. The time delay is measured by the central station by sensing a pattern of bits repetitively transmitted by the remote station and comparing the received pattern with a stored pattern and counting the number of shifts of the received pattern necessary to match the stored pattern. The delay stored by the remote station is tuned to one quarter of a bit to ensure accurate synchronization.

26 Claims, 11 Drawing Figures

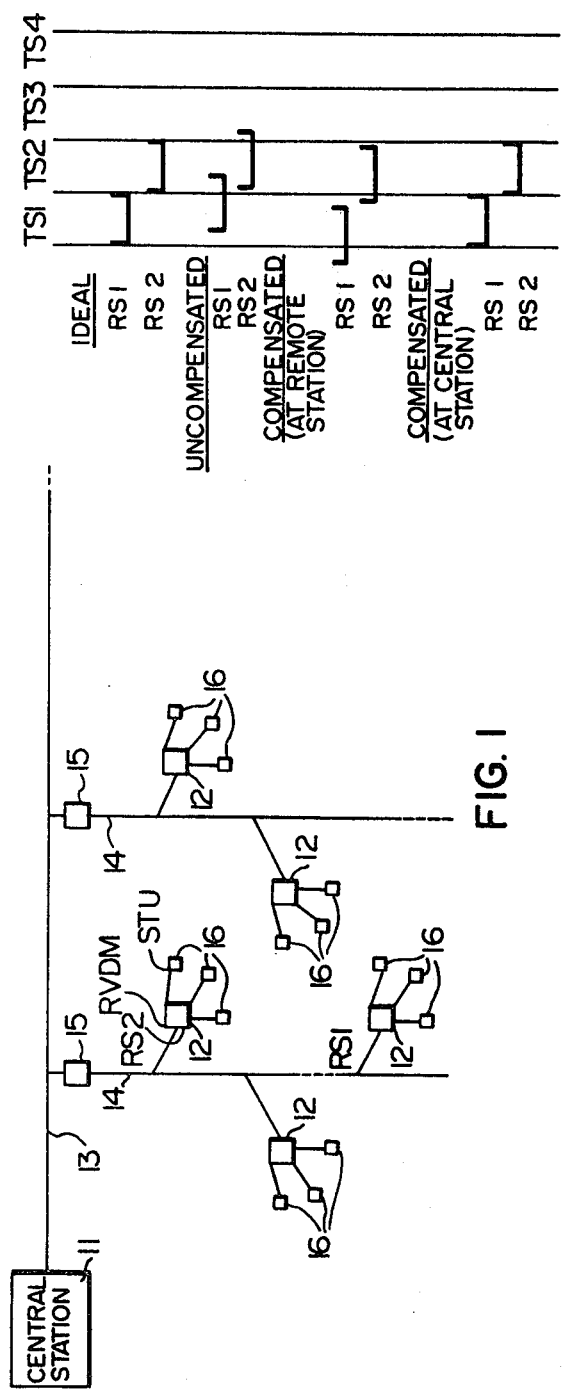

DISTRIBUTED NETWORK SYNCHRONIZATION SYSTEM

This invention relates to two-way digital transmission systems, and it is particularly directed to a synchronization system therefor.

A number of different of types of systems have been proposed for distributing information to subscribers either on an on-call basis or otherwise, and for receiving information from various subscriber stations. Information signals to be received are, for example, water and hydro meter readings, burglar and fire alarm signals, subscriber initiated requests for service, telephone signalling and communication signals, etc. Signals to be distributed sometimes include video textual information, remote load management signals, remote control signals, telephony signalling and communication signals, facsimile signals, etc.

Arrangements in various forms have been proposed for providing the distribution and collection of such signals. However a system to accommodate all of the above services, and which facilitates the addition of services as demand increases has been found to be difficult to provide. One ot the reasons for this difficulty is the problem of providing synchronization between the types of signals being transmitted to subscriber stations and being received from subscriber stations at various distances from a central distribution office. While each subscriber station could be addressed in turn, e.g. asynchronously, the time delays for transmission and reception of information would dictate an inefficient loading of the maximum possible capacity of the system.

Furthermore, where temperatures vary significantly between day and night, and with the seasons, transmission time delays would be variable, further compounding the synchronization problem, particularly where time variations are not the same as between various subscribers.

While each individual subscriber station could be adjusted manually to compensate for its own time delay, the aforenoted variations with temperature would be make subscriber station servicing both frequent and expensive. Further, as the system becomes loaded with more and more subscriber station, a serviceman would have to be dispatched to each subscriber station as it is brought into the system to manually synchronize it with the others.

The present invention relates to an automatic synchronization system for use in a distributed transmission network. It is particularly useful in a "tree" type network, such as is commonly used for distribution of CATV, (although other types of networks can be used) where a single coaxial cable, fiber optic link or the like, feeds a plurality of subscribers, therebeing a plurality of branches connected to a main trunk, with subscriber nodes connected to each branch and, a plurality of subscriber stations connected to each node. Efficient loading of the system is obtained by the use of a standard and well known DS-1 digital data format, although other forms of digital transmission can use the present invention.

In a typical DS-1 format, the data signal is forwarded in frames, 800 frames per second being transmitted. Each frame is comprised of 193 bits, divided into 24 time slots, and one frame bit, each time slot being comprised of 8 bits. Each of the 24 time slots thus provides one channel.

The 193rd bit in each frame is called a frame bit. Twelve frames form a superframe; the frame bits of each 12 frames forming a predetermined repeating pattern. The frame bit pattern is used for synchronization.

The 8th bit of each time slot on the 6th frame and each 6th frame thereafter forms a low speed so-called "A" signalling channel. The 8th bit of each time slot on the 12th frame and each 12th frame thereafter forms a second low speed so-called "B" signalling channel. Each of the A and B signalling channels provides 24, 666 bit per second data channels. Each of the 24 time slots within a frame provides a 64 kilobits per second data channel.

A problem exists in utilizing the DS-1 format in a distributed type "tree" system, in that where the central station addresses a particular remote station and instructs it to transmit within a designated time slot, the remote station clock must not only be synchronized to the central station clock, but also must transmit in a manner such that the signal will be received at the central station at the proper time. Should the central station also address another remote station, much closer to the central station, to transmit in the next time slot following the first, delay in the transmission line carrying the signal from the farther remote station could cause the signal for the first time slot to be delayed sufficiently such that it overlaps the signal in the second time slot upon arrival at the central station. As noted earlier, this could be connected by manually adjusting each remote station continuously. However according to the present invention, automatic means are provided for causing the remote station having the longer transmission delay to transmit in the same time slot of the immediately following frame at a time advanced from its designated time slot by a period sufficient to cause the signal to arrive on time, exactly in its proper time slot at the central station. This time advance will normally be ½ the time for transmission from the central station to the remote station and return (the loop delay).

Each remote station is addressed in turn and is caused to transmit at a time ahead of its designated time slot by ½ of the aforenoted loop delay. Each of the remote station clocks becomes synchronized in an unique manner related to the transmission time delay associated with itself and the central station, to the clock at the central station.

In general the digital transmission synchronization system according to the present invention is used in a system which includes a central control and at least one remote unit, and which also includes a system for transmitting digital data in a sequence of frames from the central control to the remote unit and from the remote unit to the central control, each frame including a plurality of time slots, each time slot including a plurality of bits. The invention is comprised of means for transmitting instruction data signals to the remote unit whereby the remote unit is caused to transmit predetermined signals in a time slot designated by the instruction data signals, means for determining the time difference between the designated time slot at the central control and the signals received from the remote unit in the designated time slot, means for transmitting signals representative of the time difference to the remote unit, and means for changing the time of transmission by the remote unit of signals in the designated time slot by the time difference in a direction whereby the signals arriving at the central control in the time slot and from the remote unit are in phase with the time slot at the central control.

In one embodiment the means for determining the time difference in the central control is comprised of a counter which begins counting when the signals are transmitted from the remote unit. This can be at the beginning of a frame or time slot, for example. The remote unit loops the signals back to the central control, which stops the counter when the signals are received. The number counted by the counter represents twice the time for transmission from the remote unit to the central control, i.e. the loop delay. Upon transmitting a further instruction to the remote unit designating half this time, or the one-way transmission delay, the remote unit clock is caused to advance so as to transmit subsequent signals including the designated time slot at a time in advance of the normal time by the one-way transmission delay. Its own internal clock is thus set to account for the transmission delay between the central control and the remote station, synchronizing the signal received at the central control with signals transmitted therefrom.

More generally, the inventive digital transmission synchronization system is comprised of means at the central station for transmitting a signal to a remote station, means at the remote station for looping the signal back to the central station, means for determining the time for transmission and return of the signal, means for transmitting an instruction signal to the remote station related to said times, and means at the remote station for advancing the time of transmission of subsequent signals to the central station from the remote station by a time factor such that the subsequent signals are in synchronization with a predetermined time slot at the central station.

The present invention includes means for providing both a coarse and a fine adjustment of each of the bits relative to the central control clock, in order that they should be accurate to within ¼ bit, for reliable detection.

A better understanding of the invention will be obtained by reference to the detailed description of the preferred embodiment below, with reference to the following drawings, in which:

FIG. 1A is a block diagram of a tree type digital transmission system;

FIG. 2 is a time graph showing the transmission times of a pair of remote stations within adjacent time slots;

FIG. 3 is a block diagram used to illustrate the general idea of the invention;

Figure 4:
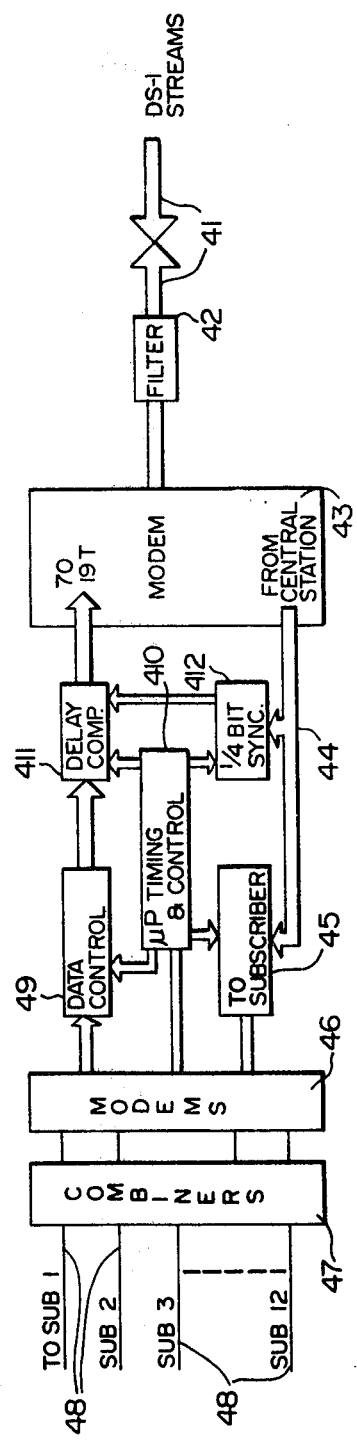
FIG. 4 is a block diagram of a time compensation system at a remote station.

Turning now to FIG. 1, a central station 11 is connected to a plurality of remote stations 12 by means of a main trunk 13, having branch feeders 14. The branch feeders can be connected to the main trunk via intermediate terminals 15. Intermediate terminals 15 need not be used if the network otherwise does not require them, and main trunk 13 can be connected directly to branch feeders or may form a feeder itself. Groups of subscriber terminals 16 are connected to remote stations 12. In practice, there may be up to, for example, 12 subscriber terminals connected to each remote station 12. A remote station, in practice, is usually located in a neighbourhood area and consequently the subscriber drops interconnecting subscriber terminals 16 with the corresponding remote stations are short with no practical transmission delay. The system is laid out similar to a cable TV system, but 2-way digital transmission is utilized.

The trunk and branch feeders typically are coaxial cable, but may be some other medium of transmission, such as optical fibers. A successful digital transmission protocol in which the present invention used is the DS-1 type system, described earlier. Preferably there are two DS-1 channels in each direction, one channel in each direction carrying the inverse signal of the other, to facilitate detection or errors. Communication between the central control and the remote stations is effected in such a system by the central station addressing individual remote stations in packets of data, and instructing them to tranmsit data stored therein back to the central station in designated time slots. The remote stations, in response, transmit packets of data in the designated time slots.

To illustrate the invention, consider now FIGS. 1 and 2 together. Let us assume that the central station instructs the remote station RS1 to transmit within a first time slot TS1, and remote station RS2 to transmit in a second, immediately following time slot TS2. The central station is continuously sending data on the trunk and branch feeders, including frame bits. These are used by the remote stations RS1 and RS2 to synchronize their internal clocks, in a well known manner.

However due the transmission delay within the main and branch feeders, the synchronizing pulses arrive at remote station RS2 first and later at remote station RS1. Accordingly their internal clocks are not in precise time with each other, nor with central station 11.

In the IDEAL condition, in which there is no time delay, a return signal from station RS1 would appear precisely within the time boundaries of time slot TS1, and the signal from remote station RS2 would appear precisely within the boundaries of time slot TS2, both time slots occurring at precisely the same instant at remote stations RS1 and RS2 and also at central station 11.

However due to the lack of synchronization between the timing of the internal clocks of remote stations RS1 and RS2 and central station 11, caused by the transmission time delay in the main and branch feeders, and due to the time delay itself, the return signal from remote station RS1 arrives at central station 11 considerably delayed in time, (UNCOMPENSATED). Since remote station RS2 is closer to central station 11, but still is some distance therefrom, its signal arrives at central station 11 at time slot TS2 delayed from its ideal time, but not delayed as severely as the signal from remote station RS1. It may be seen that at central station 11 the signals overlap, and this causes errors in decoding.

In the present invention, however, automatic means is provided for delaying the time of transmission of the signal from remote station RS1 by an amount which causes it to arrive at the central station in the next frame at a time which exactly compensates for the delay in the main and branch feeders, and as well for automatically causing the delay of the signal from remote station RS2 an amount sufficient to cause it to arrive at central station 11 exactly in time of time slot TS2 in the next frame at the central station. The compensated two signals (COMPENSATED) are shown in FIG. 2 arriving at the central station with ideal timing, as a result of the aforenoted advancement.

The present invention thus provides automatic timing compensation which is adjustable in a dynamic manner to correct for variation in delay caused by temperature changes, aging of components, etc. There is no need for periodic manual adjustment at the remote stations.

The basic idea of the invention will now be described in simple terms with the aid of FIG. 3. A central station 31 contains a counter 32 and an addressing unit 33. Central station 31 is connected to a remote station 34 (as well as to other remote stations, not shown) via a two-way DS-1 link 35.

Normally, the central station 31 provides a continuous two-way DS-1 format data stream on DS-1 link 35, and all remote stations attempt to synchronize using the frame bits and frame bit pattern noted earlier. However until each remote station is synchronized according to this invention, their transmissions within designated time slots would overlap at the central station 31 for the reasons described earlier.

In order to effect synchronization, addressing unit 33 addresses remote unit 34, and instructs it to transmit in a given time slot. Remote station 34 retransmits the DS-1 signal so that the signal transmitted from the central station 31 is returned. An alternative embodiment can loop the signal back to the central station.

At the start of the designated time slot, addressing unit 33 enables counter 32 and transmits a data word in the time slot. This is returned to central station 31 via the loop within remote station 34, and the word is recognized in word detection circuit 36. Upon detection of the word, the counter 32 is stopped. The remote station could also be instructed merely to transmit a bit at a given time within the time slot, and the timing effected between the beginning of the time slot at the central station and the reception of the bit.

Preferably counter 32 counts at a rate four times the system clock frequency. Since the delay encountered by the transmitted word in one direction (e.g. from the remote station back to the central station) is the total delay count divided by two, and since the count number is four times the number of clock cycles of the delay to the remote station and return, the number counted divided by 2 is the number of clock counts the return direction signal pulses must be advanced at the remote station in order to be received at the central station in synchronization with the designated time slot. In practice, the delay from the remote station will be one complete frame less the number of counts counted by counter 32 divided by 2. This can be translated into a delay of one frame less a given number of bits.

A signal is then transmitted via the DS-1 link 35 to the remote station instructing it to advance its transmission time by the above-determined amount. This number is stored in the remote station and its internal clock is advanced by this amount. The loop should of course be broken once synchronism has been achieved.

Counter 32 is then reset and the central station addresses another remote station, performing the described functions again. Similarly all the remote stations are addressed and their internal clocks set to the amount required to transmit signals to the central station such that they arrive precisely within a proper time slot. The entire system is thereby properly synchronized. Clearly this can be effected during any idle periods of the system, and as additional remote stations are added.

In the preferred system, a synchronization pattern is received, the pattern being incorporated in the 193rd frame bit of the DS-1 data stream. Using this frame bit pattern, the remote station achieves bit synchronization, and then frame synchronization. The remote station then transmits back to the central station, or an upstream station with which it is communicating, with a delay compensation which is determined as described above, or with alternative methods as will be described below. The build out delay compensation is then adjusted to within $\frac{1}{4}$ bit, whereupon the signal is received at the central station or at the upstream destination exactly in synchronization with a predetermined frame.

FIG. 4 is a block diagram showing in more detail one embodiment of the synchronization system within remote station 34. The bidirectional DS-1 stream 41 received from the trunk and/or branch feeders are coupled through filter 42 to modem 43. Here the DS-1 stream is demodulated and is applied via an internal bus 44 to translation circuitry 45. Translation circuitry 45 decodes the incoming bit stream and assuming the bits are in local synchronization applies the bit stream via modems 46 and combiners 47 to individual subscriber drops 48 which are connected to subscriber terminals 16 (FIG. 1).

Signals from subscriber terminals 16 are connected via subscriber drops 48 and combiners 47 into modems 46 which apply the combined signal to data control circuitry 49.

The operation of translation circuitry 45, combiners 47 and data control circuitry 49 is not pertinent to the present invention. Suffice to say that incoming data signals designated for specific subscriber terminals are received on the incoming DS-1 stream and are properly applied thereto. Similarly signals from individual subscriber terminals 16 are applied to combiners 47 via subscriber drops 48, are applied to data control circuitry 49 via modems 46, for transmission on the downstream DS-1 stream. The packetization and control is effected by a microprocessor 410 with associated circuitry, connected to translation circuitry 45 and data control circuitry 49.

The output signal from data control circuitry 49 is applied to a delay compensation circuit 411, which is connected to microprocessor 410. The output signal from delay compensation circuit 411 is connected to the input of modem 43, the output of which is connected through filter 42 to the outgoing DS-1 stream 41.

An additional $\frac{1}{4}$ bit synchronization circuit 412 is utilized, connected to the internal bus 44. This is the previously noted timing control which establishes the proper location of each bit within $\frac{1}{4}$ bit.

In operation, the remote station is addressed by a signal carried on the DS-1 stream. This signal is recognized by the microprocessor, which causes the transmission of a predetermined signal on a time slot designated in the instruction following the address to the outgoing bit stream within the designated time slot in succeeding frames.

The central station then sends a predetermined word, such as a HEX10 (00001000) down the DS-1 stream as a frame bit pattern. This signal is retransmitted or looped back on the return DS-1 stream. After determining the two-way delay, it sends an instruction to microprocessor 410 to change the delay within delay compensation circuit 411 that amount which causes signals transmitted to be advanced from the time slot at the central station the proper amount in the next frame, for example, so that it arrives at the central station exactly within the proper time slot.

Fine control of each individual bit within the time slot is provided by circuitry 412, which will be described in more detail later.

Figure 5:
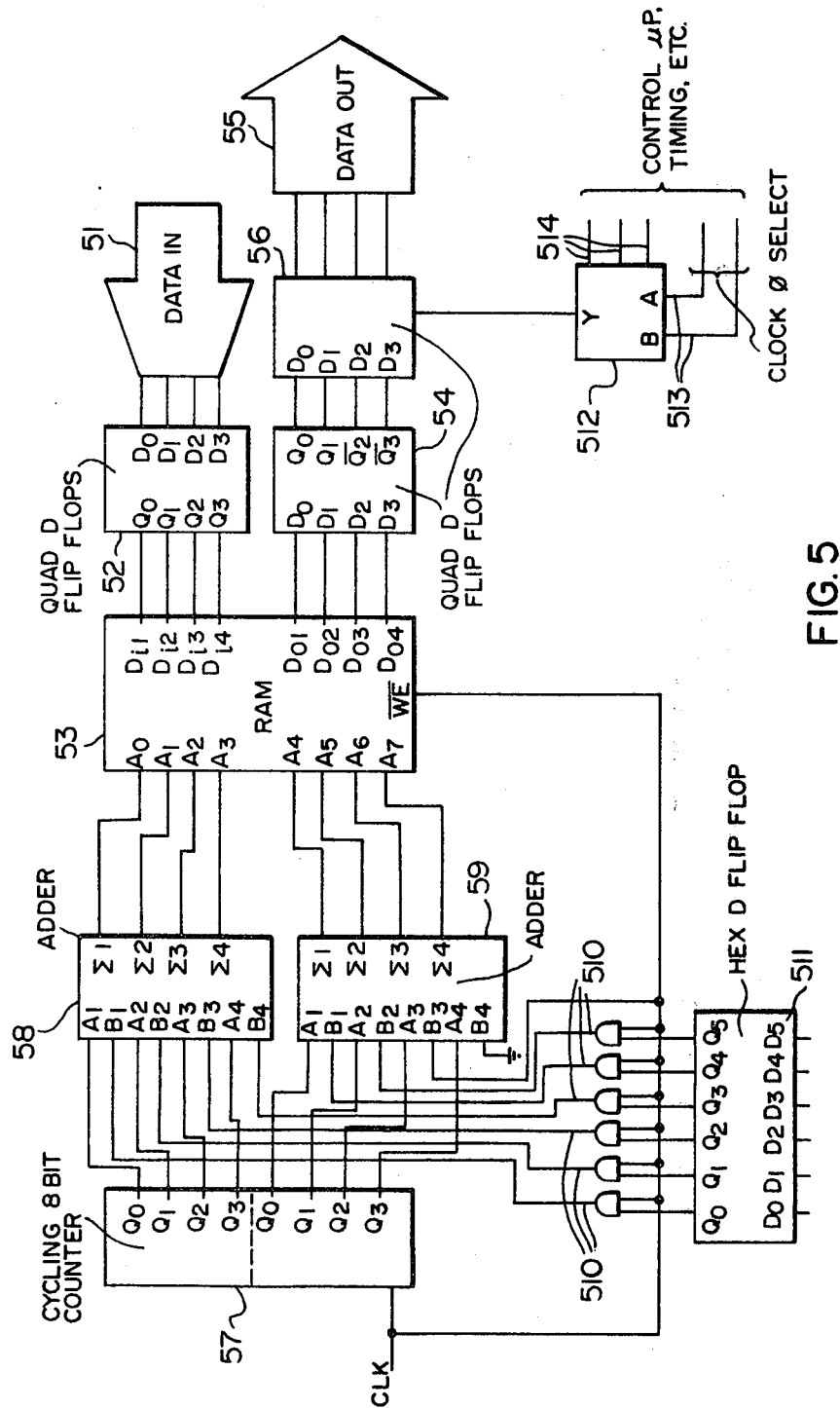
FIG. 5 is a logic diagram of a time compensation system at a remote station.

Turning now to FIG. 5, a more detailed schematic of the transmit delay compensation circuit at the remote station is shown. This circuit corresponds to delay compensation circuit 411 in FIG. 4 with a portion of the ¼ bit synchronization circuit 412 of the same figure.

Input data is received on data bus 51 and is applied to latch circuit 52, which can be, for a parallel 4 bit data bus, a quad D flip flop chip. The output Q0–Q3 of latch circuit 52 is connected to the data input terminals $D_{i1}$–$D_{i4}$ of a RAM (memory) 53. The output terminals $D_{01}$–$D_{04}$ of RAM 53 are connected to the data input terminals $D_0$–$D_3$ of latch circuit 54, which also can be a quad D flip flop chip. The data output $Q_0$–$Q_3$ of latch 54 can be connected to a data output bus 55, but is preferred to be connected to the data input $D_0$–$D_3$ of a further quad D flip flop chip 56, which is used for ¼ bit delay compensation (fine control) as will be described in more detail later.

The RAM 53 is addressed as follows. A clock source CLK is connected to the clock input of an 8 bit counter 57, which is caused to continuously cycle. The output terminals of the counter are connected to a pair of 4 bit adders 58 and 59 (or an 8 bit adder if available). The outputs of the counter are connected to inputs $A_1$–$A_4$ of adder 58 and inputs $A_1$–$A_4$ of adder 59.

The sum outputs of adders 58 and 59 are connected to the address inputs $A_0$–$A_7$ of RAM 53.

A plurality of AND gates 510 have their outputs connected to corresponding inputs $B_1$–$B_4$ of each of adders 58 and 59.

One input of each of the AND gates 510 is connected to the source of clock pulses CLK, and the other inputs are connected to corresponding outputs of a HEX D flip flop chip 511. Inputs $D_0$–$D_5$ of the HEX D flip flop 511 are connected to the data bus which is connected to the microprocessor shown in FIG. 4.

The clock input of quad flip flop 56 is connected to the output of a solid state switch matrix 512. A pair of control inputs 513 are connected to the switch matrix 512, and signal inputs 514 are connected thereto whereby one of them can be connected to the clock input of quad flip flop 56.

In operation, data signals are carried by data bus 51 for transmission to modem 43 (FIG. 4) and incorporation in the outgoing DS-1 stream. The data is latched in latch circuit 52, and appears at the data inputs of RAM 53. The local clock, synchronized to the incoming data pulses by external circuitry, and connected to the WRITE ENABLE ($\overline{WE}$) input of RAM 53, causes the RAM to write the incoming data into various address locations.

The clock also operates 8 bit counter 57, which continuously cycles, applying data signals to the A inputs of adders 58 and 59. Assuming that no signals are present at the B inputs, the sum outputs of adders 58 and 59 simply correspond to the input signal from counter 57. This signal is applied to the address inputs $A_0$–$A_7$ of the RAM, designating the address to which the incoming data from data bus 51 is to be written.

Each time the clock pulse is low, the RAM writes the data latched in latch circuit 52 into the address designated by the data signal stored in adders 58 and 59. With each successive clock pulse, counter 57 advances, advancing the address at which the next input data signal is to be stored. Once the last address designated by the counter has been filled in RAM 53, counter 57 recycles the addresses, and the new data is written over the old data at the originally, successively advancing address locations.

With the microprocessor having registered a time advance signal sent from the central control via the DS-1 bit stream for HEX D flip flop 511, the latter flip flop is accessed, and the data signal designated therefor is applied to data inputs $D_0$–$D_5$ of flip flop 511. This signal designates the time advance offset, which is stored (or latched) in flip flop 511. The stored signal appears at outputs $Q_0$–$Q_5$ of flip flop 511 and is applied to corresponding inputs of AND gates 510.

As noted earlier, during the clock low interval the RAM 53 is enabled to write data at address locations designated by the count on 8 bit counter 57. Since the clock signal is low, AND gates 510 are not enabled.

However during the clock high interval, RAM 53 is inhibited from writing, and is enabled to read data out. AND gates 510 are also enabled, and transmit to the B inputs of adders 58 and 59 the binary number stored in HEX D flip flop 511. Adders 58 and 59 add this number to the number counted on 8 bit counter 57, and the sum outputs designate new addresses in RAM 53. These new addresses designate the memory locations of the bits to be read out from RAM 53, which bits appear at outputs $D_{01}$–$D_{04}$, and are stored in latch circuit 54. These bits form the signal ultimately appearing on the data output bus 55 which are applied to modem 43 (FIG. 4) and ultimately appear in the outgoing DS-1 stream.

As counter 57 advances, input data is written into RAM 53 at successively advancing addresses designated by the binary number provided from continuously cycling counter 57.

Data is read out from RAM 53 from addresses designated by the sum of the address provided from counter 57 and the number stored in quad flip flop 511. The read address thus is in advance of the data written into RAM 53 (or can, alternatively, be considered as one frame delay less the noted advance).

Clearly the binary number stored in flip flop 511 designates the advance offset, and can be varied as required under control of the microprocessor, under instruction from the central control.

A fine control of synchronization is provided by which the output data bits can be varied in time by ¼ bit at a time. For this purpose three clock sources which are out of phase by ¼ bit are applied to corresponding leads of signal inputs 514 of switch matrix 512. Control inputs 513 are connected to clock phase select leads 513 from the microprocessor. With a control signal on one or both of leads 513, one or another of the clock phase inputs on lead 514 are switched to the output lead of switch matrix 512, and applied to the clock input of quad flip flop 516. Since the output signals from the RAM are stored in latch 54 and are applied to flip flop 56 before being applied to data output bus 55, the clock phase applied to flip flop 56 controls the phase of the bits applied to data output bus 55. Accordingly the clock control leads 513 control the phase to ¼ bit accuracy of the data being applied to the data output bus 55, by synchronizing to one of the clock phases applied to leads 514.

Figure 6:
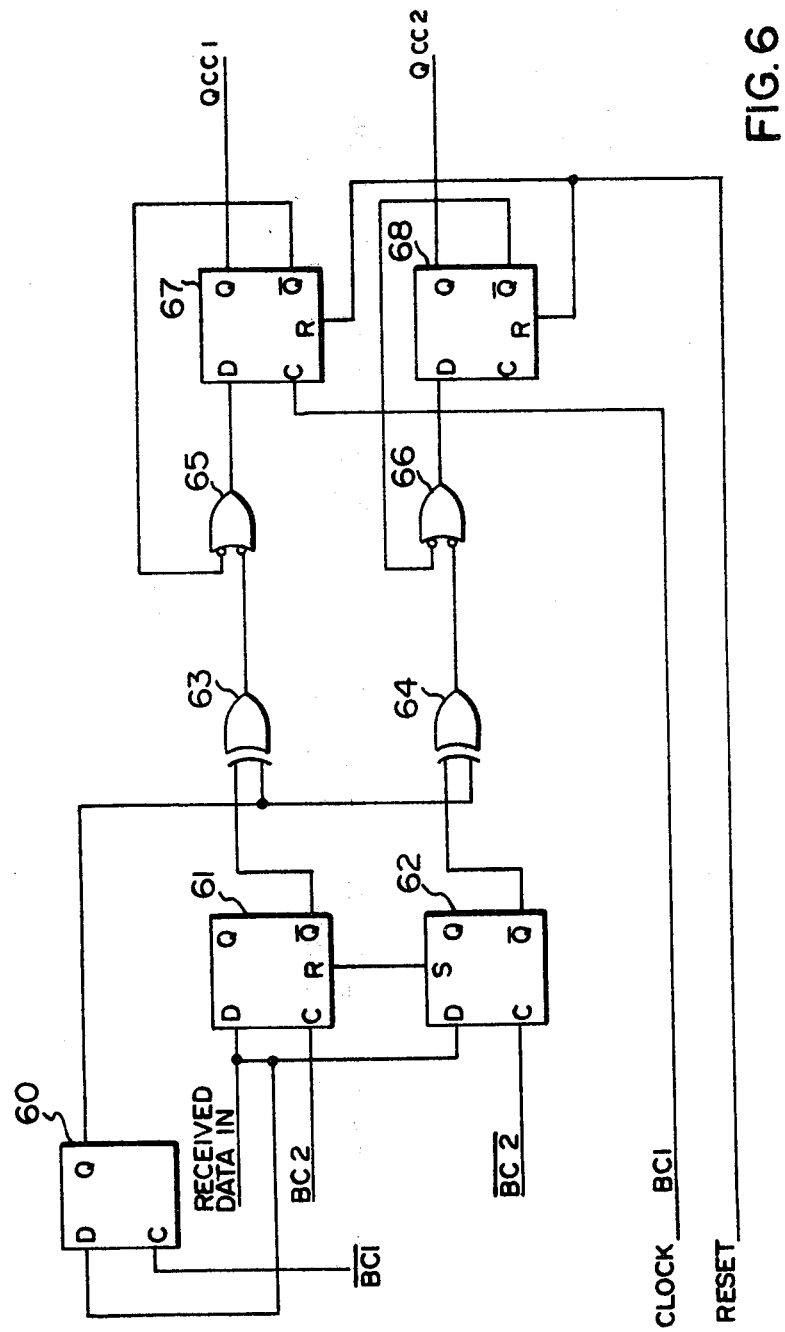
FIG. 6 is a logic diagram of a fine time compensation measurement circuit according to the preferred embodiment of the invention.

Leads 514 are respectively connected to clock sources $BC_2$, $\overline{BC_1}$, and $\overline{BC_2}$. The mode of automatically determining the measuring the phase of data transmitted by the remote unit will now be described with reference to FIG. 6.

Three flip flips 60, 61 and 62 have their data inputs connected together to a source of the input serial data bit stream, i.e., to the received DS-1 data stream. Clock source $\overline{BC_1}$ is connected to the clock input of flip flop 60 and samples the received data at its presumed centre. Clock source $BC_2$ is connected to the clock input of flip flop 61 and the opposite phase of the clock source, $\overline{BC_2}$, is connected to the clock input of flip flop 62. It may therefore be seen that as clock $BC_2$ advances, the input data appears alternately at output Q of flip flops 61 and 62.

The rising edge of $BC_2$ occurs $\frac{1}{4}$ bit before that of $\overline{BC_1}$. Therefore flip flop 61 samples the data $\frac{1}{4}$ bit before the assumed centre. The rising edge of $\overline{BC_2}$ occurs $\frac{1}{4}$ bit after that of $\overline{BC_1}$. Therefore flip flop 62 samples the data $\frac{1}{4}$ bit after the assumed centre.

The Q outputs are respectively connected to corresponding inputs of EXCLUSIVE OR gates 63 and 64. The other inputs of EXCLUSIVE OR gates 63 and 64 are connected together and to a flip flop 60.

The input data applied to flip flops 60, 61 and 62 is taken from the data received from the remote unit. It is only the phase of the pulses which are of concern, and not the actual data.

The output of EXCLUSIVE OR gates 63 and 64 are connected respectively to one input of corresponding OR gates 65 and 66. The outputs thereof are respectively connected to the data inputs of corresponding flip flops 67 and 68. The $\overline{Q}$ outputs of flip flops 67 and 68 are respectively connected to the second inputs of the corresponding inverting OR gates 65 and 66. A clock source is connected to the clock inputs of flip flops 67 and 68, and the Q outputs thereof form the outputs of the circuit QCC1 and QCC2, representing the difference in the sampled, from the received data.

The data to be transmitted is sampled at the assumed centre of the received bit. The output data should preferably not be shifted more than $\frac{1}{4}$ bit from the center of the received bit. The sampled output data is therefore checked for conformity with this criterion.

Having described the coarse and fine control of timing at the remote station, a description of the central station automatic synchronization control will now be made with reference to FIG. 7. This synchronization control is to be used in conjunction with a digital transmission system in which a central station polls remote stations which return data in the DS-1 format (preferably) which was described earlier. Such systems as T-1 carrier which use the DS-1 format are well known, and is assumed that a person skilled in the art using this invention can provide a preferably microproccesor controlled polling system as noted. The central station should have the capability of selecting a particular remote station by address and recognizing a returned signal from that station, and of formating and forwarded messages thereto and for receiving them therefrom.

The central control automatically adjusts the synchronization in two stages: (a) bit phase, and (b) frame phase. Bit phase adjustment is effected first, and is done in $\frac{1}{4}$ bit adjustments. Frame phase adjustment is made in 1 bit adjustments.

When the power is first turned on, the central control applies a DS-1 signal including a frame bit pattern (preferably HEX10) down the transmission medium to all remote stations. It is preferred that the central station should fill the time slot assignments with "filler" data which provides bit transitions, but no instructions or data, to the remote stations.

With reception of the signal from the central station, all of the remote stations synchronize their local clocks in a well known manner. After a period of time sufficient to allow the remote stations to synchronize to the DS-1 clock rate, the central station should forward a signal addressed to the first remote station to be synchronization corrected. The original signal is transmitted back to the central station.

As was noted earlier, it is preferred that there should be two DS-1 transmission lines in each direction. Accordingly the two received DS-1 lines 71 and 72 are shown in FIG. 7 and the received signals are applied to corresponding three bit shift registers comprising, in one embodiment, flip flops 73a, 74a, and 75a connected in series to the first DS-1 line 71, and 73b, 74b and 75b series connected to the second DS-1 line 72. The flip flops are connected to a clock source operating at four times the DS-1 rate. If only one incoming line is used, one of the shift registers will of course be deleted.

The Q output of each of the flip flops is connected to a data selector 76, whose function will be described in more detail below.

The output of the center flip flops 74a and 74b are respectively connected to corresponding flip flops 77a and 77b, which latter flip flops are connected to a source of clock pulses operating at the DS-1 rate. The Q outputs of flip flops 77a and 77b are connected to the output DS-1 lines 78 and 79.

The remote station address from the received signal is applied via address bus 710 to comparator 711. At the same time the address of the selected station had been loaded into a register 712 from data bus 713 by the local microprocessor. The register is enabled through well known circuitry from the microprocess including application of a write signal applied through OR gate 714, or the presence of the selected address code on a selected address bus 715 applied to a decoder 716, which provides a write signal through OR gate 714 to register 712 when the address has been decoded. The selected address bus is present at the time of reception of the received signal from the designated remote station.

The selected address and the received signal source address are compared in comparator 711 and if they match, an output pulse is generated. A circuit 716 detects the output pulse at the output of comparator 711 and provides a control signal on leads 716 to data selector 76. The function of this selection is determine whether the address of the received signal has its source on DS-1 line 71 or DS-1 line 72. As a result, the incoming data signals applied to either one of the two 3 bit shift registers comprising flip flop 73a, 74a and 75a or 73b, 74b and 75b is selected.

Let us assume for example that the shift register connected to DS-1 line 71 has been selected. Data selector 76 connects the Q outputs of flip flops 73a, 74a and 75a through to EXCLUSIVE OR gates 717 and 718. One terminal of EXCLUSIVE OR gates 717 and 718 are connected together to the output of flip flop 74a, the other input to EXCLUSIVE OR gate 717 is connected to the output of flip flop 73a, and the other input to EXCLUSIVE OR gate 718 is connected to the output of flip flop 75a by data selector 76.

A comparison of the signals stored in the flip flops of the shift register is thus made, ¼ bit at a time (due to the clock rate of 4 times the DS-1 clock applied to the shift register flip flops). If the outputs of flip flops 73a and 74a are different, the outgoing DS-1 signal is late with respect to the incoming rate. If the outputs of flip flops 74a and 75a are different, the outgoing DS-1 signal is early, or in advance, relative to the incoming signal rate. If the outputs of all three flip flops are the same, the incoming bit stream is in phase with the outgoing.

The output of EXCLUSIVE OR gate 718, carrying a signal designating phase delay of the outgoing signal relative to the incoming is connected to a late counter 719, and the output of EXCLUSIVE OR gate 717 is connected to an early counter 720. Each of counters 719 and 720 are clocked at the DS-1 rate. Assuming that the outgoing signal is late relative to the incoming, each time a DS-1 frame occurs, late counter 719 is clocked, and advances its count. Conversely for phase advance, counter 720 accumulates a digit count for each frame.

The microprocesssor addresses counters 719 and 720 via line decoder 716, which apply their digit counts (one of which will be zero if there is no exact synchronization) to data bus 713 through tri-state gates 721 (only of which is shown here for each counter). Reading the count from the addressed counter, the microprocessor formulates and transmits a message to the remote station to cause it to advance or delay the phase of its outgoing signal in the manner described earlier, to synchronize its phase with the phase of the outgoing bits at the central station.

When there is no further phase adjustment required as evidenced by both counters 719 and 720 registering no phase difference counts, the next stage of frame phase adjustment is undertaken. There are two general methods of frame phase adjustment which will be described below, both with the aid of FIG. 7.

Using the first technique of frame phase adjustment, the microprocessor causes a pulse to be transmitted in the fourth bit position of the first time slot of a frame looped or retransmitted by the remote station back to the central station. It will be recalled that each frame is comprised of a 193 bits, one of which is the frame (synchronization) bit, and the remaining 192 bits being divided into 24 times slots, each 8 bits in length. The fourth bit position thus occurs centrally at about 178 the time into the time slot. The microprocessor sets either an internal or external counter at the first bit position, and expects to receive the returned bit four counts later.

Figure 7:
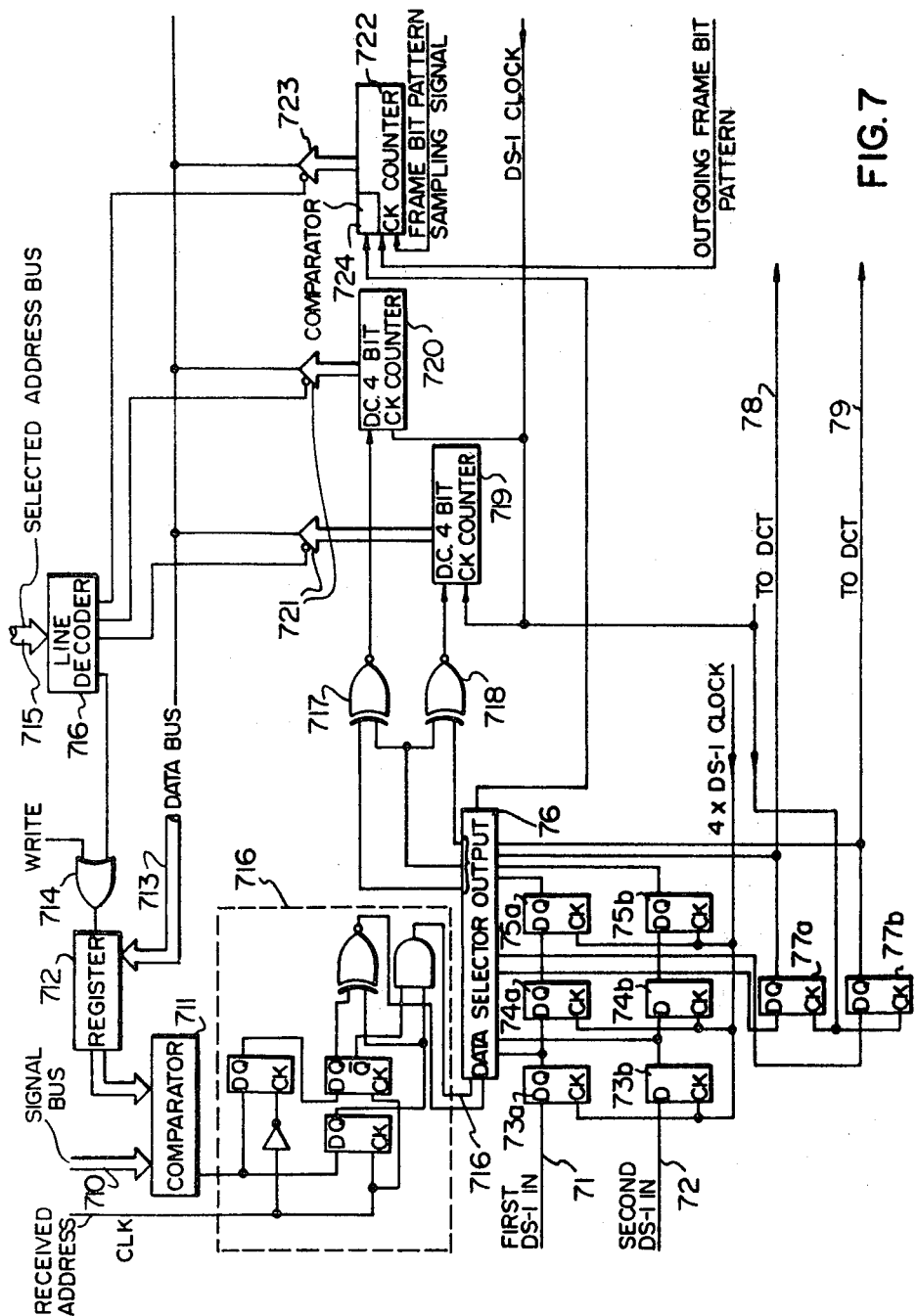
FIG. 7 is a logic diagram of the compensation measurement system at the central control.

One of the two flip flops 77a and 77b (both clocked at the DS-1 rate), selected as the DS-1 lines 71 or 72 described earlier, has its output applied via data selector 76 to a latch, illustrated in FIG. 7 and labelled as a counter (for the second technique) 722. In this embodiment however, the block 722 is a latch for storage of the received bit for transfer to data bus 713 via tri-state gate 723. The gate is enabled by the microprocessor upon decoding of its address in line decoder 716.

Alternatively, and preferably, block 722 is a serial to parallel shift register operating directly from the output of data selector 76. The bit received from the flip flop 77 is thus stored therein for reception by the microprocessor upon addressing.

With the microprocessor polling the tri-state gate 723 at the fourth bit position, if the expected pulse is present, it recognizes that the frames are exactly in phase, and no further phase adjustment of the remote station is required.

However if the pulse is not present, the microprocessor prepares and forwards an instruction to the remote station to advance its synchronization, in a manner described earlier. If the microprocessor detects bits stored in the shift register (722), it can recognize the bit position, and formulate an instruction to the remote station to introduce synchronization delay in order to move the bit to the fourth bit position. If the signal bit is in the fourth bit position, of course the entire frame is in synchronization. It should be recognized that a 1 bit in the fourth bit position corresponds to the 1 bit in a HEX10.

Once the address of remote station has been synchronization adjusted, transmitting at the correct time for synchronization at the central office, the central station addresses a second remote station, repeating the sequence described above. Eventually all of the remote stations are brought into synchronization, their clocks being synchronized to the DS-1 rate, with time offsets according to the last adjustment ordered from the central station.

A second technique of frame phase adjustment will now be described. As noted earlier, in the DS-1 protocol, the frame bits form a code repeated every twelve frames.

Since the bit phase has already been adjusted, the outputs of flip flops 74a and 74b are assumed to be an accurate representation of the input signal, and these are applied to flip flops 77a and 77b which are clocked at the DS-1 rate. Their outputs are applied to data selector 76 which, in a manner described earlier, selects the output of one of flip flops 77a and 77b.

The output of the latter flip flop is applied via data selector 76 to the input of a comparator 724. Also applied to comparator 724 is a signal consisting of the frame bit pattern which has been received by the central station, looped therefrom by the remote station. The output of comparator 724 is applied to counter 722. The output of counter 722 is applied to the input of tri-state gates 723 (only one of which is shown for clarity), the output of which is applied to data bus 713. Gates 723 are enabled upon addressing from the microprocessor, their address being decoded in decoder 716, which is connected to the enable input of gate 723.

If the frame bit pattern is the same as the received frame bits, the comparator will indicate this and output a signal to the counter of a kind which does not advance it. If the counter, after 12 frames, contains a count, clearly the frames are out of synchronization, and this is read by the microprocessor as described earlier.

It is necessary to specify which bit of the received frame is to be compared with the outgoing frame bit pattern, and the result registered in counter 722. This specification is effected by clocking the counter from a frame bit pattern sampling signal lead. A clock pulse is applied to this lead in synchronism with the particular pulse of each frame to be compared. For example, if it is the second pulse of each frame which is to be compared for conformity with the outgoing frame bit pattern, a clock pulse is applied on the frame bit pattern sampling signal lead at the same time as the second bit of the outgoing DS-1 stream from the central station to the remote station. The object, of course, is to find the time location of the frame bit. If counter 722 registers a count after each 12 frames, the counter microprocessor clears and the frame bit pattern sampling signal is advanced one bit; the next bit in each frame is examined by clocking counter 722 at the third bit in each frame.

The frame bit pattern sampling signal is derived from the central control clock source. The DS-1 bit stream is normally obtained by originating a DS-1 clock rate, and logically obtaining signals corresponding to some or all of the bit positions. Accordingly frame bits, 193 bits apart, are normally generated.

A position counter, either in the microprocessor or a separte component, registers zero when the frame bit pattern sampling signal is at the frame bit position as generated by the central control. Assuming that counter 722 registers a count, as described above, it is cleared and the frame bit pattern sampling signal is connected to the source of signals corresponding to the first bit position, under control of the microprocessor. At the time the position counter, previously registering zero, is caused to register "1".

Again, if no match of the outgoing frame bit pattern with the incoming frame bit pattern is found by counter 722 registering a count, the frame bit pattern sampling signal is connected by the microprocessor to a source of pulses corresponding to the second bit position in each frame. The counter, previously registering "1", is advanced to "2".

In this manner each bit position of the incoming signal is compared with the outgoing frame bit pattern for a match. As soon as a match is found, counter 722 registers zero, and the frame phase delay in the loop is known, by the count registered in the bit position counter.

The number in this counter is divided by two (to account for the loop being double the length from the remote station to the central station), is subtracted from 193 (the number of the bits in the frame) in the microprocessor, and an instruction is sent by the microprocessor to the remote station to delay the signal by this number of bits. Frame synchronization thus is obtained.

The frame bit pattern sampling signal can also be generated by storing the bit position number the bit in each frame to be sampled in a first register. The number of the bit being received after the frame bit is also counted and stored in a second register. When the bit numbers match, a pulse is generated, and this pulse forms the frame bit pattern sampling signal.

The timing of the frame bit pattern sampling signal can be shifted by storing an adjacent number in the first register. When the frame bit pattern has been found to match, the number stored in the first register to generate the frame frame bit pattern sampling signal which corresponds to the frame delay.

The operation of the last-described registers can be obtained in the microprocessor which is programmed to effect the operations described in detail above, or alternatively separate component registers can be used.

With both the bit phase and frame phase adjusted throughout the entire system, the central office can poll each remote station to enable the forwarding of packets of data in the most efficient manner. The data will be forwarded from each remote station with one frame delay, but in precise synchronization at the central office.

While further phase adjustments may be necessary with temperature variation and aging of components, such variation is minor, and unless a remote station is shut off, the ¼ bit phase synchronization will be all that is periodically required to be adjusted. Such adjustment can be effected during regular automatic maintenance by the central control, during off-peak hours, or if desired, regularly during idle transmission breaks, which will typically occur several times each second or few seconds.

Figure 8:
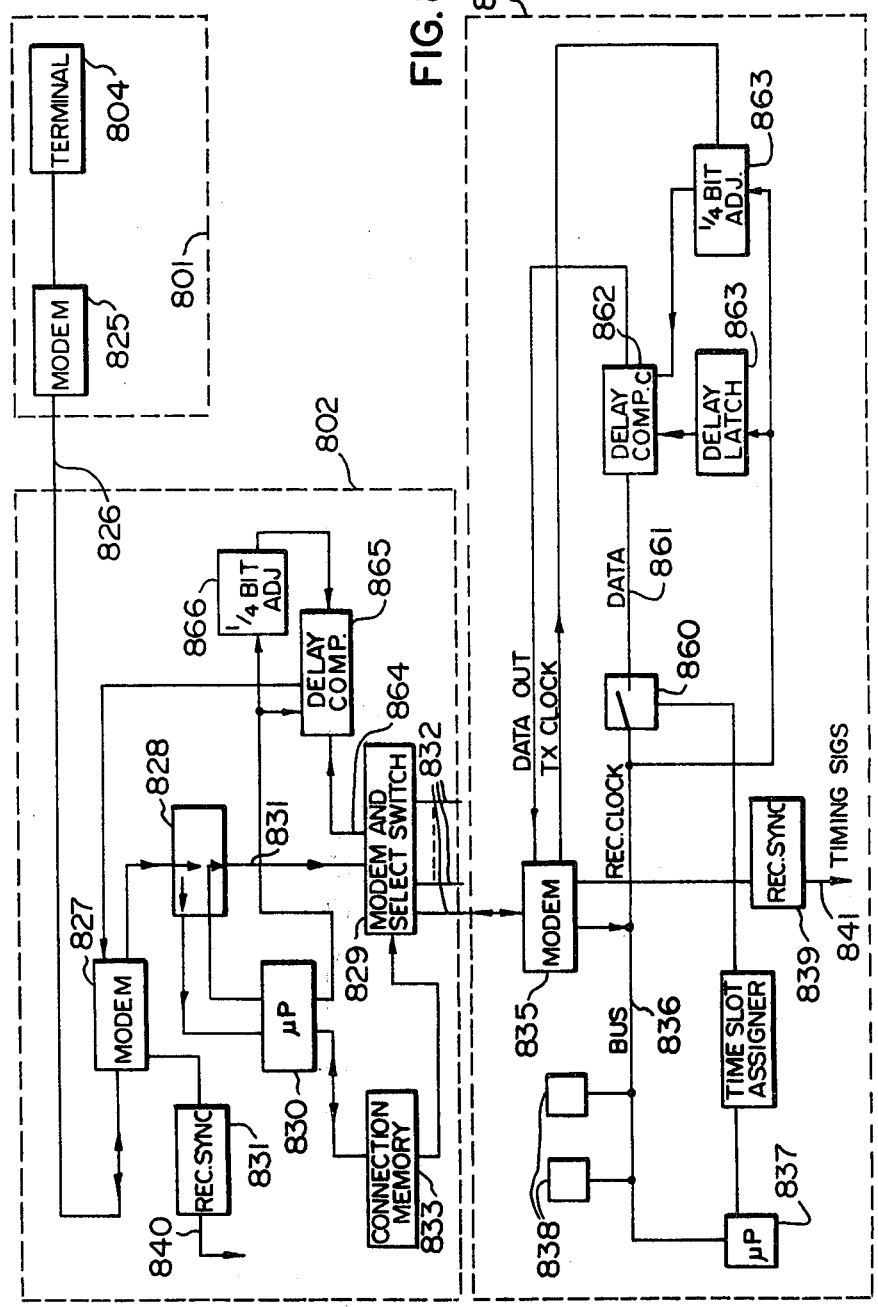
FIG. 8 is a block diagram of a system using the present invention.

A complete preferred form of the invention in a system will now be described with reference to FIGS. 8-11, in which FIG. 8 shows the system and FIGS. 9-11 the synchronization elements thereof.

FIG. 8 is a block diagram showing elements of a two-way transmission system which uses the preferred embodiment of the self synchronization invention. The synchronization system is depicted using as an example a central station 801, an intermediate station 802 and a subscriber terminal 803. While the aforenoted stations and terminals are used for illustration purposes, it will be realized that the same or similar principles can be used where further intermediate stations are interposed between, for example, the central station and intermediate station 802. For example this system can be used in a tree-type network, with a single central station 801, communicating with a plurality of intermediate stations along a trunk transmission line, each of these stations communicating with a plurality of intermediate stations 802 connected along branch transmission lines, each of which communicate with a plurality of subscriber terminals 803. Since this type of system is heirarchial, each lower ordered station synchronizes itself to data signals received from a higher ordered station to which it is connected, and transmits data thereto, in a manner to be described below, so that the data signals are received in proper synchronization at the higher ordered station.

The example system shown in FIG. 8 is comprised of central station 801, as noted earlier, with control terminal 804, which includes a circuit as described with reference to FIG. 7 therein. Terminal 804 transmits and receives data via modem 825 and two-way transmission path 826 to intermediate station 802. As noted earlier, it is preferred that the data should be transmitted according to the DS-1 data format which has been described earlier.

The received data signals which include control and data bits are demodulated in modem 827, and are passed into a latch and switching circuit module 828. From the data signals are applied through modem 829, after the control bits are passed to microprocessor 830, which substitutes new control bits and applies them to the outgoing data path 831 to modem 829. Modem 829 includes a selection switch for applying data from data path 831 to respective outgoing STU drops 832, under control of a connection memory 833 (which retains record of what frames of incoming data are destined for various subscriber terminals), itself under control of microprocessor 830.

A typical subscriber terminal 803 connected to STU drop 832 is shown, with one STU drop connected to a subscriber terminal modem 835. Modem 835 is connected via a bus system 836, whereby data signals are passed to a subscriber terminal microprocessor 837. Various peripheral devices 838 are operated under control of the microprocessor 837 in response to reception of data signals over STU drop 832.

In order to synchronize the system, each of the intermediate stations and subscriber terminals must be placed into synchronization. As described earlier there is of course delay in the system due to component operation time, transmission path line propagation delays, etc. For example, transmission along a main trunk transmission path may introduce a delay anywhere from close to zero to ½ frame; typical propagation delays between intermediate stations or intermediate stations and subscriber terminals each has been typically found to be between close to zero and 1/6th frame. Therefore there is considerable time delay between transmission at the central control and reception at the subscriber terminal. The first step in synchronization is therefore to place each of the units in "receive synchronization".

A receive synchronizing circuit 839 is shown in both intermediate station 802 and subscriber terminal 803, and both can be similarly constructed, although a person skilled in the art might introduce variations for specific application. The bit clock output of modems 827 and 835 are connected to the input of synchronization circuits 839, and the output of these synchronization circuits are timing signals, on leads 840 and 841 respectively. The bit clock is a 1.544 megahertz clock signal, in the preferred embodiment, which is derived from a 12 megahertz carrier signal (via a divide-by-8 circuit in the modem), which carrier signal carries the data bits which are demodulated therefrom in the modem.

The receive synchronization circuits are for the purpose of synchronizing the frame timing in each of the stations with the received data frames from the central station. The frame bits transmitted from central station 801 preferably forms a HEX10, i.e., a 00001000 pattern; this clearly places the 1 at the approximate center or 4th bit position of a frame. To achieve receive synchronization, the corresponding bit of each frame is examined for determination of the frame bit pattern, and if found, it is assumed that frame synchronization has been achieved. However if the frame bit pattern is not found, the next bit in each frame is examined, and so on. The preferred circuit for performing this function is shown in FIG. 9.

Figure 9:
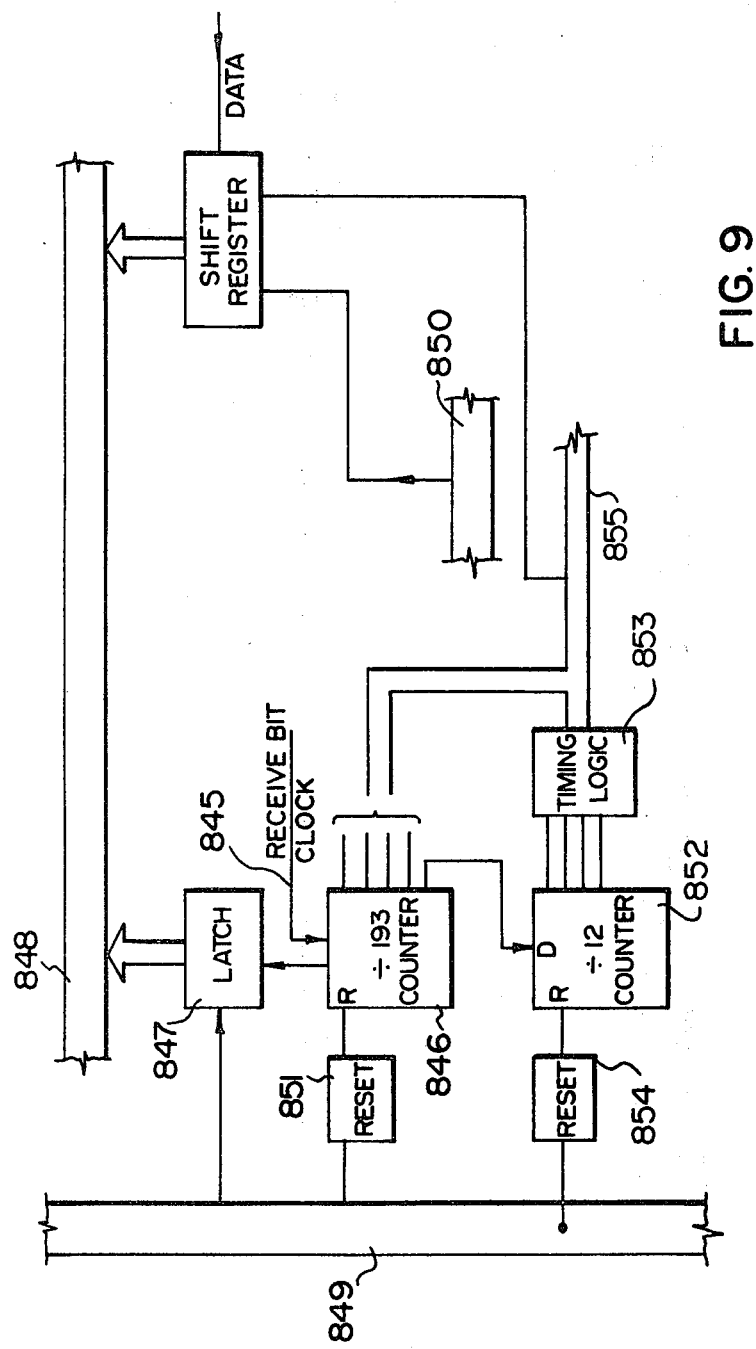
FIG. 9 is a diagram of a preferred receive synchronization circuit for use in the system of FIG. 8, and FIGS. 10 and 11 are diagrams of two forms of delay build-out circuits for use in the system of FIG. 8.

Turning now to FIG. 9, the receive bit clock signal is applied via lead 845 to a divide-by-193 counter 846. Each 193rd bit is applied to latch 847, the output signal of which is applied to data bus 848. A microprocessor (not shown) is connected to data bus 848, as well as to a write strobe bus 849 and a read strobe bus 850. The microprocessor is of conventional construction and need not be described further since it is well known to persons skilled in the art. When counter 846 reaches the 193rd bit, it generates an interrupt to the microprocessor, causing the microprocessor to read the data bit applied to bus 848 (which corresponds to part of bus system 846 of FIG. 8). Latch 847 stores the count which is applied to data bus 848, generating the microprocessor interrupt. Latch 847 is strobed by a signal on the write strobe bus 849, and when the proper count is applied to the data bus 848, the microprocessor reads the data bit also applied to data bus 848 from modem 835. In intermediate station 802, microprocessor 830 reads the data bit applied thereto from the data path leading from switching circuit 828.

Upon reception of a group of 8 bits, the microprocessor compares them with a HEX10 group of bits stored in its memory. It should be noted that the HEX10 merely constitutes a single 1, flanked on both sides by a plurality of 0s. It is preferred that a plurality of groups of 8 signals should be examined, and averaged, in case a noise pulse is mistaken for a 1.

If a 1 is detected, the microprocessor applies a signal via reset circuit 851 from the write strobe bus 849 to reset counter 846, to cause it to count 192, rather than 193. This effectively shifts the time for examination of the pulse which is examined in each frame by one bit. This cycle is continued until the microprocessor detects a full HEX10, whereupon the counter 846 is allowed to continue counting 193 bits, which is a full DS-1 frame. Bit synchronization is thus achieved.

It should be noted that the frame bits of the A and/or B channel can be used for obtaining synchronization. Since the A channel bits are the least significant bit of each time slot in the 6th frame and every successive 12th frame, if the system is badly out of synchronization, the fifth and seventh frames, for example, will not contain any of the frames bits used for synchronization. Since the synchronization bits may actually appear in those frames according to the determination of the receiving station or terminal, the bits examined in the assumed 6th frame may not contain 1s. In this case the microprocessor shifts examination of bits a full frame time, until it detects a 1, after which it examines each successive frame bit until a HEX10 at the appropriate time is detected.

The output of counter 846 is also applied to a divide-by-12 counter, which counts frames. Since in the aforenoted example, the frame bits used for synchronization preferably are in the A channel, the A channel occurring in the 6th and each suceeding 12th frame, the divide-by-12 counter establishes the frame count number, which is determined by timing logic circuit 853. Counter 852 is reset from the write strobe bus 849 by reset circuit 854. The output of timing logic 853 and counter 846 is a timing bus 855 comprised of leads carrying various timing signals such as frame bit signals, frame 6 timing signals, 8 bit timing signals, etc., as required for the remaining circuitry.

Receive timing is thus achieved in each of the successively lower ordered stations and terminals in the system.

While the stations and terminals have now synchronized with the received signals, each is time delayed from the other. However each of the successively higher ordered terminals including the central station must receive signals in proper time frame with its transmitted signal, in order to avoid confusion of received signals from various terminals connected to the bidirectional transmission line. Proper timing is achieved using a delay build out in each of the lower ordered stations and terminals, which causes their signals to be delayed exactly that amount which is required to place the signal precisely in the proper time slot for reception by the higher ordered station. The achievement of this synchronization is here called "transmission synchronization". Two different ways of achieving this are shown in FIGS. 10 and 11, which are used in the system of FIG. 8. An example of the use of the circuit of FIG. 10 will be described with reference to the subscriber terminal, and an example of use of FIG. 11 will be described with reference to the intermediate station of FIG. 8.

Assuming that data to be transmitted appears on bus system 836, of FIG. 8, this is applied through switching circuit 860 (which can be a tri-state CMOS switch), via a data lead 861 to a delay compensation circuit 862. Here the data is delayed exactly that amount required for it to be received in the same frame (if advanced), or in the next frame if desired, as the data transmitted to the subscriber terminal from the intermediate station 802. In a successful prototype of this invention, data was transmitted from intermediate station 802 to subscriber terminal 803 in frame 6, and was applied to delay compensation circuit 862 in frame 5 of the next frame sequence. Of course frame 5 will be delayed from the actual frame 5 at the intermediate station 802, and therefore if transmitted directly back will be delayed and not in synchronization therewith. However delay compensation circuit 862 introduces sufficient delay to cause the data signal applied on lead 861 in frame 5 to be delayed sufficiently that when combined with the return path delay arrives in synchronization with frame 6 at intermediate station 802.

It was previously described how the desired delay is determined, i.e., by transmitting a single pulse, a HEX10, or a predetermined signal in one frame through the system and determining the delay as received at the transmitter. This is used to formulate a delay compensation signal which is transmitted to the microprocessor, such as microprocessor 837. Microprocessor 837 applies a data word signal to a delay latch 863, which applies the signal to delay compensation circuit 862, causing it to delay signals on lead 861 by the designated amount. Accordingly the data output from delay compensation circuit 862 to modem 835 for transmission along the subscriber drop 832 back to intermediate station 802 constitutes the proper delay, taking into account the additional line propagation delay from modem 835 to modem 829, as well as the component delay times.

Similarly, a ¼ bit adjustment circuit 863 is controlled by microprocessor 837 via the bus system 836 and applies ¼ bit clock variation signals to delay compensation circuit 862 as described earlier. The ¼ adjustment circuit itself is clocked by the transmitting clock is derived from the 12 megahertz carrier signals received by modem 835 in a similar manner as the receive clock.

In intermediate station 802 the data signals received from modem 829 are applied via lead 864 to delay compensation circuit 865, which has its data output applied to modem 827 for transmission along transmission path 826 to central station 801, for adjustment of signals to be received at the central station in proper synchronization. Delay compensation circuit 865 is controlled by microprocessor 830, and has a ¼ bit adjustment circuit 866 also connected thereto for fine correction of data bits.

Figure 10:
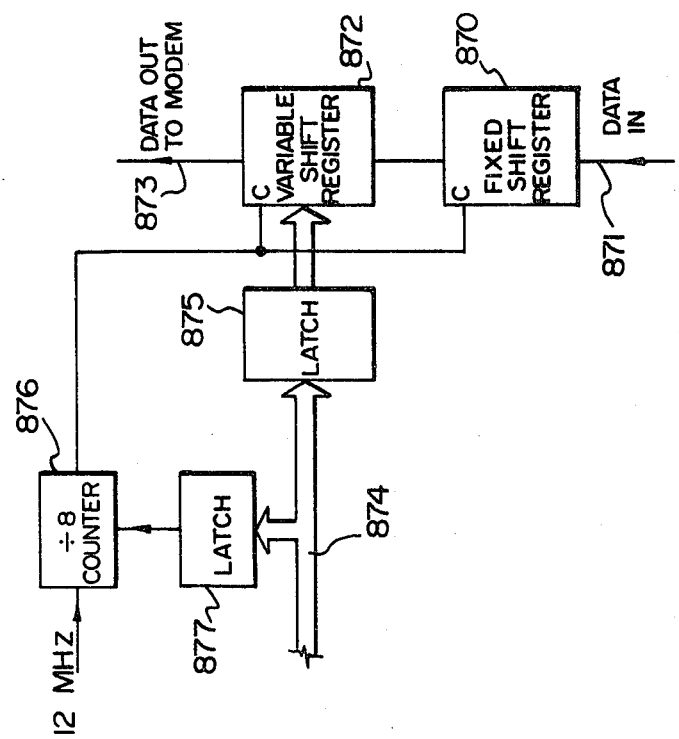

The delay compensation circuit preferred for subscriber terminal 803 is shown in FIG. 10. This is comprised of a fixed shift register 870, which has been usefully found to have a delay capacity of 128 bits, to which data is input on lead 871. Its output signal is applied to the input of a variable shift register 872, which preferably will introduce a controllable delay of from 0 to 64 bits. It should be noted that the total possible delay is 192 bits, which is a complete frame with the exception of the frame bit. The output of shift register 872 is applied to lead 873, which is connected to the modem, i.e. 835 in FIG. 8.

A delay data word signal is applied from the local microprocessor on data bus 874 to latch 875. Its output sets the specific delay in shift register 872. Accordingly data signals received on lead 871 are delayed by 128 bits plus the amount of the delay set by the microprocessor in shift register 872. Of course the combination of the fixed and variable delays can be set according to local experience with whatever line propagation delays are found.

The transmit clock signal derived from the incoming carrier, i.e. 12 megahertz is applied to a divide-by-8 counter 876, the output of which is applied to the clock inputs of shift register 870 and 872. This ensures that the output data bits are in phase with the input data bits.

However the phase of counter 876 can be adjusted in ¼ bit intervals by applying the output of two bit latch 877 thereto, in order to introduce an additional ¼ bit when required, the input of latch 877 being connected to data bus 874. Since two bits at a time can be introduced to counter 876, its phase can be varied by 2, 4, or 6, where required, in order to adjust the phase by 90, 180, or 270°. This fine control ensures correct phase synchronization of data bits at the intermediate station, since the ¼ bit synchronization is effected under local microprocessor control, with reception of a control signal from intermediate station 802.

Figure 11:
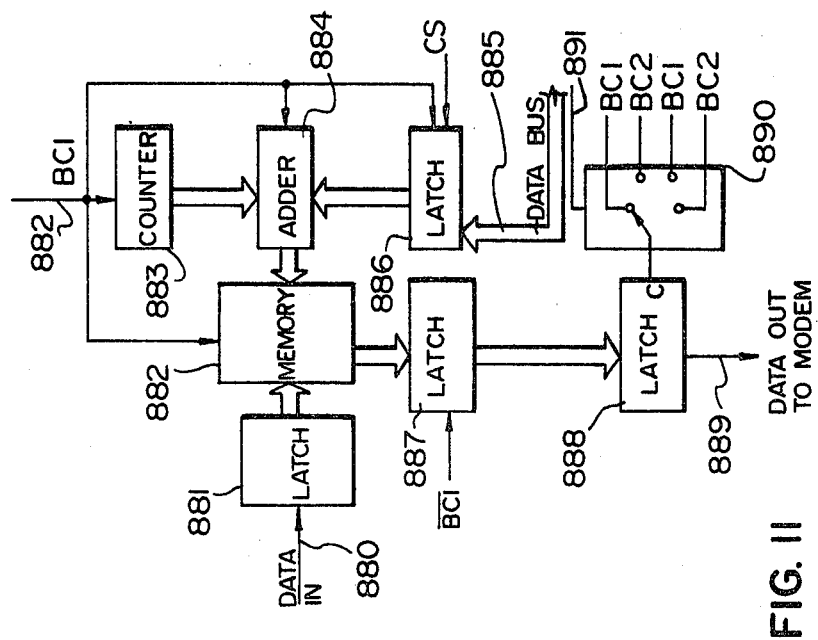

Another form of delay compensation is shown in FIG. 11, which is preferably used in intermediate station 802 to introduce delay to achieve synchronization with a higher ordered station. This form of delay compensation is similar to that described with reference to FIG. 5. Typically intermediate station 802 receives signals in one frame, and transmits so that the signals received by the next higher ordered frame are in synchronization with the next frame.

Data signals, i.e., received on lead 864 (FIG. 8) are applied via lead 880 to latch 881. The data is applied to memory 882 at sequential addresses. The addresses are generated by clock pulses from the received bit clock lead 882, there source being derived from the received carrier signal divided down to 1.544 megahertz. The bit clock signals are applied to counter 883, which applies its output count to adder 884. The count signals are applied to the address input of memory 882. Since the received data, memory 882 and address are all clocked with the received bit clock, the data signals are stored at sequential addresses established by the increasing count in counter 883.

To establish the delay, a delay code signal derived from the central control, as described earlier, is applied from the local microprocessor via data bus 885 to a latch 886. The output of latch 886 is applied to adder 884. Also applied to latch 886 is a chip select signal applied from the microprocessor.

When writing data, a signal is not present on the chip select CS lead, and consequently there is no output from latch 886, and the address indicated for writing is not present in adder 884 from counter 883.

However, during reading, a signal is present on the CS lead, and the address applied to memory 882 is the sum of the signals applied from counter 883 and latch 886. Accordingly the memory is read at a different address than the one at which it is writing. The address difference, taking into account the clock time, establishes the delay build out.

The output of memory 882 is applied to latch 887, to which a bit clock signal is applied in time with the reading cycle. The output of latch 887 is applied to latch 888, and the data output signals are carried on lead 889 to the output modem 827 (FIG. 8).

Means is also provided for ¼ bit phase adjustment as described earlier. The clock input on latch 888 is connected to a switching circuit 890, which connects the clock output to one of four bit clock phases, each mutually 90° out of phase, BC1, BC2, $\overline{BC1}$ and $\overline{BC2}$. Switching circuit 890 is controlled by leads 891 from the microprocessor. Switching circuit 890 can of course be a logic circuit which controls a plurality of tri-state CMOS switches.

Using the aforenoted circuits, each of the succeeding lower ordered stations places itself in receive synchronization with signals received from higher ordered stations. Each of the stations or terminals also transmits at a time which is specifically delayed so as to cause its data to be received in frame synchronization at the next higher ordered station. Due to the delay, the data signals are received in the next higher numbered frame. However if desired a station such as the subscriber terminal can transmit at a time which matches the frame number which is transmitted from its associated intermediate station. In this case it applies data to the delay build out circuit in the next frame group in a frame number which is previous to the desired received frame number. The delay build out delays the early transmission to a time exactly matching the transmitted frame. In this manner an entire tree system can self synchronize, allowing the formation of major sized two-way data transmission networks which do not require the intervention of manual synchronization adjustments, and which continuously compensate for variations in transmission and other delays.

A person skilled in the art understanding this invention may now conceive of other embodiments or variations thereof. All are considered within the sphere and scope of the invention as defined in the claims appended hereto.

The embodiments of the invention in which an exclusive property or privilege is claimed are defined as follows:

1. A digital transmission system comprising a central station and a plurality of remote stations, each station including means for transmitting and receiving digital data in a sequence of frames, transmission means arranged between said central station and each of said remote stations and causing a variable inherent delay therebetween dependent upon the location of the respective remote station, the central station including means for transmitting a first signal to each of said remote stations chosen in turn and for receiving a signal therefrom dependent on the first signal and means for producing from said first signal and said received signal a delay signal representative of the inherent delay relative to the chosen remote station and for transmitting said delay signal to said remote station, and each remote station including means for receiving and storing said delay signal and means for changing the time of transmission of the transmission means of said remote station in dependence upon said stored delay.

2. A system as defined in claim 1 wherein each remote station includes means for synchronizing a nominal time of transmission of said transmission means with data signals received from said central station and wherein said time changing means advances the actual time of transmission relative to said nominal time in dependence upon said stored delay.

3. A system as defined in claim 1, wherein the transmission means is of the tree-type arranged to connect from said central station to each of said remote stations effectively sequentially.

4. A system as defined in claim 1 wherein the transmitting and receiving means are arranged such that each frame includes a plurality of time slots, wherein each remote station includes means responsive to said first signal to transmit signals in a time slot designated by said first signal and wherein said delay signal producing means comprises means for determining the time difference between said designated time slot at the central control and the signals received from said remote unit in said designated time slot.

5. A system as defined in claim 1 wherein the transmitting and receiving means are arranged such that each frame includes a plurality of bits, wherein each remote station includes means responsive to said first signal to transmit a bit at a predetermined time in a frame, and wherein said delay signal producing means comprises means for determining the time difference of the bit in the frame at the central station from the time of the bit in the frame upon reception from the remote station.

6. A system according to claim 1 wherein each remote station includes means responsive to said first signal for transmitting first data signals having a repetitive predetermined pattern of data bits at regular time-spaced intervals and wherein the central station includes means for sensing individual data bits at the pattern rate, means for storing a representation of the predetermined pattern and comparing it with the sensed bits, means responsive to the absence of a match between the sensed pattern and the stored pattern for shifting the rate of pattern sensing by one bit for each such absence sensed and means responsive to a match between the sensed pattern and the stored pattern for counting the numbers of such shifts.

7. A system as defined in claim 4, in which the central control includes a counter, means for causing the counter to begin counting at a predetermined time in said designated time slot, means for stopping the counter upon reception of said signals at a corresponding predetermined time in a received one of said designated time slots, and means for transmitting a signal representative of the count reached by the counter after the counter has stopped counting, to the remote unit, to control the change of time of transmission by said remote unit of said designated time slot.

8. A system as defined in claim 4, in which the remote unit includes a memory, means for applying data signals to the memory, means for generating a write address signal for addressing the memory whereby the data signals are written into the memory, means for registering said signal representative of said count, means for generating a read address signal offset from the write address by said signal representative of said count, and means for addressing the memory with the read address signal whereby the data stored in the memory is read out for transmission to the central control.

9. A system as defined in claim 7, in which the remote unit is comprised of a digital memory adapted to store data signals input thereto, cycling counter means for generating address signals, adder means having a first plurality of inputs connected to the output of the counter means and having a plurality of outputs connected to the address inputs of the memory, a plurality of latches adapted to store a data signal corresponding to said count reached by the central control counter, the outputs of the latches being connected via a corresponding plurality of gates to a second plurality of inputs of the adder means, the memory having a plurality of data output terminals, means for enabling the write control of the memory and the adder means to apply the address signals applied thereto by the counter to the address terminals of the memory whereby data signals applied thereto are written and are stored therein, and means for enabling said gates whereby the data signal stored in the plurality of latches is applied to the adder means for causing the address signals applied to the memory to be the sum of the data signal applied from the cycling counter and the data signal stored in the plurality of latches, whereby the data signals are progressively stored at first sequential memory locations of the memory and are progressively read out of the memory from second sequential memory locations offset from the first sequential memory locations by the data signal stored in the plurality of latches.

10. A system as defined in claim 9, further including a second plurality of latches connected to the data output terminals of the memory, for storing the output data therefrom, a clock input to the second plurality of latches for clocking the data out from the latches to a data output bus, a plurality of clock sources each having a phase different from each other and means for connecting one of the clock sources to the clock input of the second plurality of latches whereby the phase of the data signal stored in the second plurality of latches applied to the data output bus is controlled.

11. A synchronization system as defined in claim 10, in which the phase difference of each of the plurality of clock sources is ¼ bit.

12. A system as defined in claim 5, in which said bit is a frame synchronization bit occurring at a boundary of said frame.

13. A system as defined in claim 5, in which each frame is comprised of a plurality of time slots, each time slot being comprised of a plurality of bits, said bit occurring at a time period of approximately one half of a designated time slot.

14. A system as defined in claim 5, 12 or 13 in which said bit occurs in a signal transmitted from the central station to the remote station and looped back to the central station.

15. A system as defined in claim 5, in which said means for determining said time difference at the central station is comprised of a 3 bit shift register, means for applying the received signal to the shift register, means for clocking the shift register at 4 times the bit rate of said received signal, means for comparing the bit status in the second bit position of the shift register with the binary bit status in the first and third bit positions of the shift register, first and second comparing means for comparing differences between bits in the second and first bit positions and between bits in the second and first bit position respectively of said shift register at said 4 times the bit rate, for designating the late or early phase difference between bits in transmitted and received digital data signals at the central office in ¼ bit increments, each count unit designating a ¼ bit increment, whereby said instruction signal can be established to cause the remote station to vary its time of transmission by ¼ bit increments to synchronize said transmitted and received bits at the central station to within ¼ bit.

16. A system as defined in claim 15, in which each frame is comprised of a plurality of time slots, each time slot being comprised of a plurality of bits, said bit occurring at a designated bit position within a designated time slot.

17. A system as defined in claim 5, 15 or 16, in which the transmitted and received bits are substantially in phase at the central station, said means for determining said time difference comprising means for transmitting a predetermined digital signal to said remote station, means at the remote station for looping said predetermined signal back to the central station, means at the central station for comparing the time of transmission of said predetermined signal with the time of reception of the predetermined signal from the remote station, to establish said time difference.

18. A system as defined in claim 5, 15 or 16, in which the transmitted and received bits are substantially in phase, in which each frame includes a frame synchronization bit arriving at a designated time in each frame, groups of frame synchronization bits forming repetitively cycling frame bit patterns transmitted by the central station, means at the remote station for looping the frame bit pattern back to the cental station, means at the central station for comparing the transmitted frame bit pattern with the received frame bit pattern, a counter clocked with each transmitted frame bit, connected to the comparing means for counting each time a transmitted and received frame bit is different, whereby said instruction signal can be established to cause said remote station to vary its time of transmission of each frame by one bit each time said counter registers a count.

19. A system as defined in claim 5, 15 or 16, in which the transmitted and received bits are substantially in phase, in which each frame includes a frame synchronization bit arriving at a designated time in each frame, groups of frame synchronization bits forming repetitively cycling frame bit patterns transmitted by the central station, means at the remote station for looping the frame bit pattern back to the central station, means at the central station for comparing the transmitted frame bit pattern with the received frame bit pattern, a first counter clocked with each transmitted frame bit, connected to the comparing means for counting each time a transmitted and received frame bit is different, means for clocking the first counter by a frame bit pattern sampling signal, a second counter for storing a digital designation of the number of a bit from the beginning of a frame to be applied to the first counter in each received frame for comparison with the transmitted frame bit, means for generating a pulse comprising the frame bit pattern sampling signal each time the number of a received bit from the beginning of each frame matches the number stored in the second counter, means for sequentially increasing the number stored in the second counter each time the first counter registers a count, whereby the number stored in the second counter when the first counter registers no counts over the period of at least one frame bit pattern is designative of the frame time difference.

20. A system as defined in claim 5, in which said means for determining said time difference is comprised of means for comparing the phase difference between transmitted and received bits at the central station for establishing said instruction signal for transmission to the remote station to cause it to vary its time of transmission to bring said transmitted and received bits at the central station substantially into phase, and further means for comparing the number of bits of phase difference between transmitted and received frames which are in substantial bit phase for establishing a further said instruction signal for transmission to the remote station to cause it to vary its time of transmission by said number of bits to cause it to vary its time of transmission to bring said transmitted and received frames and bits into substantial synchronization at the central station.

21. A system as defined in claim 8, 15 or 20, in which each remote station includes a memory, menas for applying data signals to the memory, means for generating a write address signal for addressing the memory whereby the data signals are written into the memory, means for registering said signal representative of said count, means for generating a read address signal offset from the write address by said signal representative of said count, and means for addressing the memory with the read addres signal whereby the data stored in the memory is read out for transmission to the central control.

22. A system as defined in claim 15, in which each remote station is comprised of a digital memory adapted to store data signals input thereto, cycling counter means for generating address signals, adder means having a first plurality of inputs connected to the ouptput of the counter means and having a plurality of outputs connected to the address inputs of the memory, a plurality of latches adapted to store a data signal corresponding to said count reached by the central control counter, the outputs of the latches being connected via a corresponding plurality of gates to a second plurality of data output terminals, means for enabling the write control of the memory and the adder means to apply the address signal applied thereto by the counter to the address terminals of the memory whereby data signals applied thereto are written and are stored therein, and means for enabling said gates whereby the data signal stored in the plurality of latches is applied to the adder means for causing the address signals applied to the memory to be the sum of the data signal applied from the cycling counter and the data signal stored in the plurality of latches, whereby the data signals are progressively stored at first sequential memory locations of the memory and are progressively read out of the memory from second sequential memory locations offset from the first sequential memory locations by the data signal stored in the plurality of latches.

23. A system as defined in claim 22, further including a second plurality of latches connected to the data output terminals of the memory, for storing the output data therefrom, a clock input to the second plurality of latches for clocking the data out from the latches to a data output bus, a plurality of clock sources each having a phase different from each other and means for connecting one of the clock sources to the clock input of the second plurality of latches whereby the phase of the data signal stored in the second plurality of latches applied to the data output bus is controlled.

24. A system as defined in claim 23, in which the phase difference of each of the plurality of clock sources is ¼ bit.

25. A digital transmission system comprising a central station and a plurality of remote stations, each station including means for transmitting and receiving digital data signal in a sequence of frames, transmission means arranged between said central station and each of said remote stations and causing a variable inherent delay therebetween dependent upon the location of the respective remote station, the central station including means for transmitting a first signal to a chosen one of said remote stations and for receiving a signal therefrom dependent on the first signal and means for producing from said first signal and said received signal a delay signal representative of the inherent delay relative to the chosen remote station and for transmitting said delay signal to said remote station, and each remote station including means for receiving and storing said delay signal, means for synchronizing a nominal time of transmission of the transmission means of said remote station with data signals received from said central station and means for advancing the actual time of transmission of the transmission means relative to said nominal time in dependence upon said stored delay.

26. A digital transmission system comprising a central station and a plurality of remote stations, each station including means for transmitting and receiving digital data in a sequence of frames, tree-type transmission means arranged from said central station to each of said remote stations effectively sequentially and causing a variable inherent delay between the central station and each of the remote stations dependent upon the location of the respective remote station on the transmission means, the central station including means for transmitting a first signal to each of said remote stations chosen in turn and for receiving a signal therefrom dependent on the first signal and means for producing from said first signal and said received signal a delay signal respresentative of the inherent delay relative to the chosen remote station and for transmitting said delay signal to said remote station, and each remote station including means for receiving and storing said delay signal, means for synchronizing a nominal time of transmission of the transmission means of said remote station with data signals received from said central station and means for advancing the actual time of transmission of the transmission means relative to said nominal time in dependence upon said stored delay.

* * * * *